United States Patent
Ebsen et al.

(10) Patent No.: US 10,558,392 B2
(45) Date of Patent: Feb. 11, 2020

(54) ENHANCING QUALITY OF SERVICE OF A STORAGE DEVICE

(71) Applicant: Seagate Technology LLC, Cupertino, CA (US)

(72) Inventors: David Scott Ebsen, Shakopee, MN (US); Dana Simonson, Owatonna, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/639,893

(22) Filed: Jun. 30, 2017

(65) Prior Publication Data

US 2019/0004733 A1 Jan. 3, 2019

(51) Int. Cl.
*G06F 3/06* (2006.01)

(52) U.S. Cl.
CPC .......... *G06F 3/0659* (2013.01); *G06F 3/0604* (2013.01); *G06F 3/0653* (2013.01); *G06F 3/0656* (2013.01); *G06F 3/0673* (2013.01); *G06F 3/0676* (2013.01)

(58) Field of Classification Search
CPC .... G06F 3/0659; G06F 3/0653; G06F 3/0604; G06F 3/0673; G06F 3/061; G06F 3/0658; G06F 3/0611; G06F 3/656
See application file for complete search history.

(56) References Cited

U.S. PATENT DOCUMENTS

| | | | |
|---|---|---|---|
| 7,490,261 B2 | 2/2009 | Gaertner et al. | |
| 2006/0015653 A1* | 1/2006 | Lum | G06F 1/3268 710/5 |
| 2010/0235569 A1 | 9/2010 | Nishimoto et al. | |
| 2013/0054871 A1* | 2/2013 | Lassa | G06F 3/061 711/103 |
| 2014/0089629 A1* | 3/2014 | Griffin | G06F 12/0246 711/173 |
| 2014/0244892 A1 | 8/2014 | Goss et al. | |
| 2014/0281260 A1 | 9/2014 | Peterson et al. | |
| 2016/0162186 A1* | 6/2016 | Kashyap | G06F 3/061 711/103 |
| 2016/0170656 A1* | 6/2016 | Tressler | G06F 3/0604 711/103 |
| 2016/0224255 A1 | 8/2016 | Park et al. | |
| 2016/0253091 A1 | 9/2016 | Ayyavu | |
| 2016/0313946 A1 | 10/2016 | Zang et al. | |
| 2017/0269852 A1* | 9/2017 | Lin | G11C 16/3427 |
| 2018/0074708 A1* | 3/2018 | Gerhart | G06F 3/064 |

* cited by examiner

*Primary Examiner* — Zhuo H Li
(74) *Attorney, Agent, or Firm* — Taylor English Duma LLP (57) ABSTRACT

Systems and methods presented herein provide a controller that is operable to monitor a plurality of background commands to a storage device over a pre-determined period of time and to determine how often each of the background commands is issued during the pre-determined period of time. The controller is further operable to establish a time interval for each of the background commands, and to issue each of the background commands at their respective time intervals.

17 Claims, 9 Drawing Sheets

ENHANCING QUALITY OF SERVICE OF A STORAGE DEVICE

SUMMARY

Systems and methods presented herein provide for enhancing quality of service (QoS) of a storage device. In one embodiment, a controller is operable to monitor a plurality of background commands to the storage device over a pre-determined period of time, to determine how often each of the background commands is issued during the pre-determined period of time, to establish a time interval for each of the background commands, and to issue each of the background commands at their respective time intervals.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
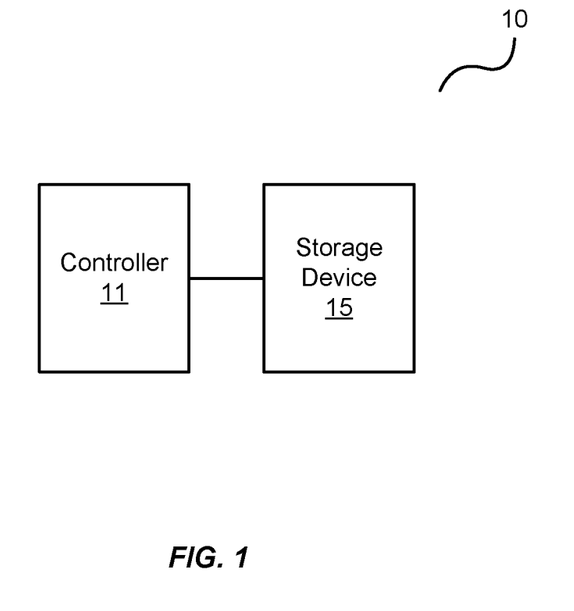
FIG. 1 is a block diagram of an exemplary storage system for enhancing QoS for a storage device.

FIG. 1 is a block diagram of an exemplary system 10 for enhancing QoS of a storage device 15. The system 10 comprises a controller 11 operable to read data from and write data to a storage device 15 communicatively coupled thereto. The controller is also operable to run background processes on the storage device 15 by issuing specific commands.

A background process (e.g., data retention scans, garbage collection, read disturb scans, data integrity scans, etc.) is a computer process that runs "behind the scenes" and without user intervention. As background processes can consume resources, such as processor and memory usage, the controller 11 is operable to reduce the impact of the background process on the read and write operations of the storage device 15, thereby enhancing the QoS of the storage device 15. For example, background processes send requests to the storage device 15 that contend for processing resources. When a background process is "bursty" in nature or when multiple background processes occur on or about the same time, they can degrade the QoS by extending the durations of the read and write operations. The controller 11 manages the times in which commands of the background processes are issued so as to improve the QOS of the storage device 15.

In one embodiment, the storage device 15 is a non-volatile NAND flash device configured using one or more SSD architectures, such as Single Level Cell (SLC) architectures and Multi-Level Cell (MLC) architectures. An SLC architecture allows a memory cell to store one bit of data. Traditionally, an MLC architecture meant that a memory cell could store two bits of data. But, architectures have evolved and now provide even higher levels of density, such as Triple Level Cell (TLC) architectures that store three bits per memory cell, and Quad Level Cell (QLC) architectures that store four bits per memory cell. Generally, though, any architecture storing more than one bit of data per cell may also be referred to as an MLC architecture.

Typically, each memory cell of a flash device is configured like a Metal Oxide Semiconductor Field Effect Transistor (MOSFET) with a control gate. But, each memory cell also has a floating gate surrounded by an insulating oxide layer configured between the control gate and the channel of the MOSFET. Because the floating gate is electrically isolated by its insulating layer, electrons placed on it are trapped until they are removed by an application of an electric field (e.g., an applied voltage). Placing electrons on the floating gate sets the transistor to the logical "0" state. Once the floating gate is charged, the electrons in it screen the electric field from the control gate, thereby increasing the threshold voltage of the memory cell. This means that a higher voltage is applied to the control gate to make the channel of the transistor conductive.

In order to write a value from the transistor, an intermediate voltage between the threshold voltages is applied to the control gate. If the channel conducts at this intermediate voltage, the floating gate is uncharged and causes a logical "1" to be stored in the memory cell. If the channel does not conduct at the intermediate voltage, it indicates that the floating gate is charged causing a logical "0" to be stored in the memory cell. The presence of a logical "0" or a logical "1" is sensed by determining whether there is current flowing through the transistor when the intermediate voltage is asserted on the control gate.

Based on the foregoing, the controller 11 is any device, system, software, firmware, or combination thereof operable to read data from the storage device 15, to write data to the storage device 15, and to perform various other operations on the storage device 15 (e.g., background scans, garbage collection, error correction encoding/decoding of data on the storage device 15, etc.). The storage device 15 is any device capable of storing data, persistent or otherwise. Examples of the storage device 15 include NAND flash memory devices, magnetoresistive random-access memory devices, magnetic disks, Random Access Memories (RAMs, such as DRAMs), or various combinations thereof. Accordingly, the controller 11 is operable to perform the processes disclosed herein on any variety of storage devices.

Figure 2:
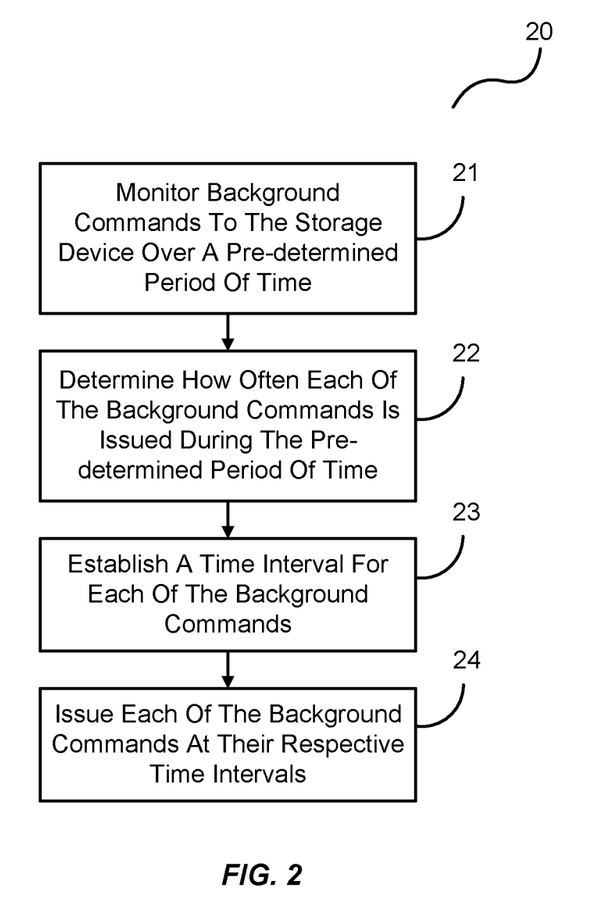
FIG. 2 is a flowchart of an exemplary process of the storage system of FIG. 1.

FIG. 2 is a flowchart of an exemplary process 20 of the system 10 of FIG. 1. In this embodiment, the controller 11 monitors background commands to the storage device 15 for a predetermined period of time, in the process element 21. For example, background processes for the storage device 15 are performed at various times and can overlap one another. A media scan on a NAND flash device may be performed once per day (e.g., to ensure that the memory cells are reading correctly). Data retention scans of a NAND flash device may be performed once every three days (e.g., to ensure data is not being affected by charge leakage of memory cells). Garbage collection on the NAND flash device may be performed routinely throughout a single day (e.g., so as to free up storage space of the storage device). Examples of other background processes include read disturb scans, read-retry scans, read voltage calibrations, data integrity scans, background reads for NAND error mitigation, and background writes for NAND error mitigation. The background processes are initiated by commands that the controller 11 executes. The controller 11 monitors the commands of the background processes so as to determine how often each of the background commands is issued during the predetermined period of time, in the process element 22.

Once the information about the background commands is ascertained, the controller 11 establishes a time interval for each of the background commands, in the process element 23, such that the commands do not overlap one another or burst onto I/O processing at inopportune times. For example, if the controller 11 did not know when commands for background processes were issued, the commands could overlap in time and contend for processing utilities and/or NAND die resources at the same time, reducing the QOS that the storage device 15 provides. Alternatively or additionally, commands for background processes could be issued at periods of increased workloads to the storage device 15, thereby contending for processing utilities that may be used by read and write I/O processing. In whatever the case, the controller 11 establishes the time intervals for the background commands based on the monitoring over the predetermined period of time, such that the controller 11 may issue them at the respective time intervals, in the process element 24, so as to avoid processing contention and improve the QOS of the storage device 15.

Figure 3:
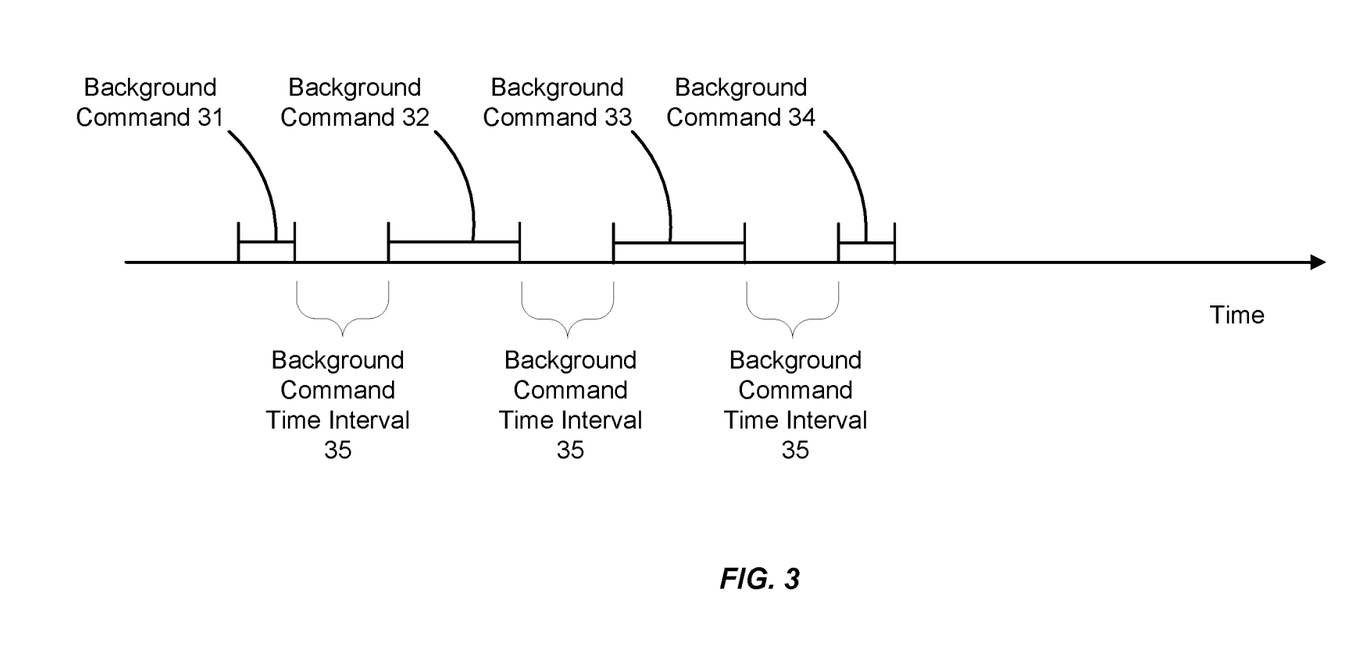
FIG. 3 is an exemplary timing diagram of background processes issued to a storage device.

FIG. 3 is an exemplary timing diagram of a plurality of background commands issued by the controller 11 to the storage device 15. In this embodiment, once the controller 11 has monitored the background operations of the storage device 15 and determined their periodicity, the controller 11 assigns timeslots to the background commands. For example, a background command 31 (e.g., garbage collection on a block of a flash device) is assigned a first timeslot, a next background command 32 (e.g., a daily media scan) is assigned a next timeslot separated by a background command time interval 35 such that the background command 32 does not overlap the background command 31. Another background command 33 (e.g., an every third day data retention scan) is assigned a next timeslot separated by another background command time interval 35. And yet another background command 34 (e.g., an hourly read retention scan) is assigned a timeslot after that separated by a background command time interval 35.

Although illustrated herein as having common background time intervals 35 separating the background commands 31-34 such that the background commands 31-34 do not overlap in time, the embodiment is not intended be limited to a common time interval. For example, the time interval 35 may be adaptively configured based on a workload of the storage device 15. That is, the controller 11 may monitor read and write I/O commands to the storage device 15. And, during periods of more intense reading and writing to the storage device 15, the controller 11 may further space the background command time interval such that the background commands 31-34 can occur during less intense periods of reading and writing to the storage device 15, further improving the QOS of the storage device 15.

Also illustrated in this embodiment, the background commands 31-34 may have varying durations. For example, a garbage collection command (e.g., background command 31) issued for a single block of a flash device may be shorter in duration than a daily media scan (e.g., the background command 32) which would be operable to scan the entire storage device 15. Accordingly, the embodiment is not intended to be limited to any particular duration of background command.

Figure 4:
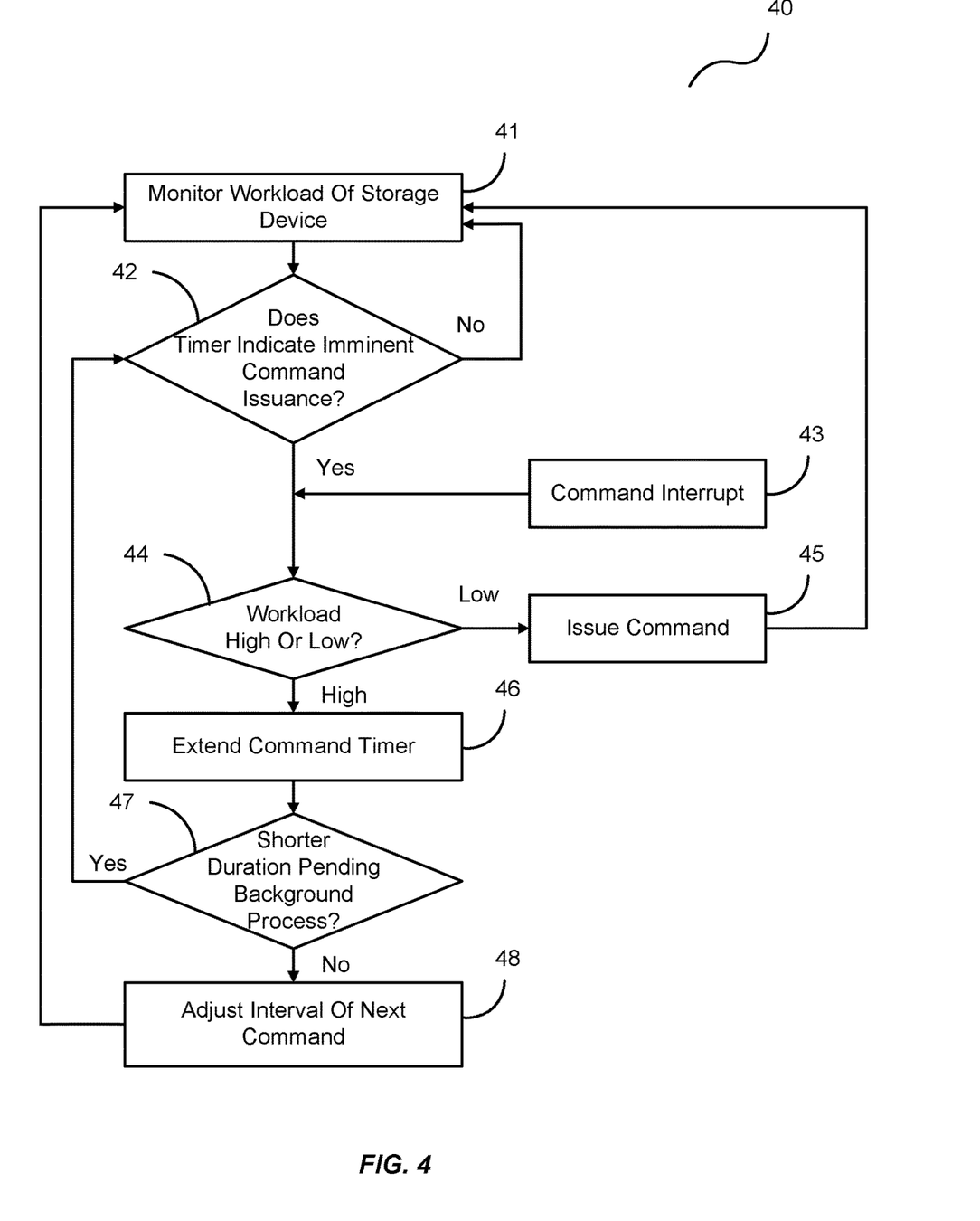
FIG. 4 is a flowchart of another exemplary process of the storage system of FIG.

FIG. 4 is a flowchart of another exemplary process 40 of the storage system 10 of FIG. 1. In this embodiment, controller 11 as previously mentioned monitors a workload of the storage device 15, in the process element 41, to determine whether the storage device 15 is experiencing a high or low workload. The controller 11, after assigning the timeslots to the background commands to issue, the controller 11, initiates a timer for each of those background commands. In this regard, the controller 11 determines whether a timer of a background command indicates an imminent issuance of the command, in the process element 42. If not, the controller 11 continues monitoring the workload of the storage device 15, in the process element 41. If, however, the timer indicates that a background command is about to issue to the storage device 15 to begin a background operation on the storage device 15, the controller determines the current workload level of the storage device 15 (e.g., high or low), in the process element 44.

Figure 5:
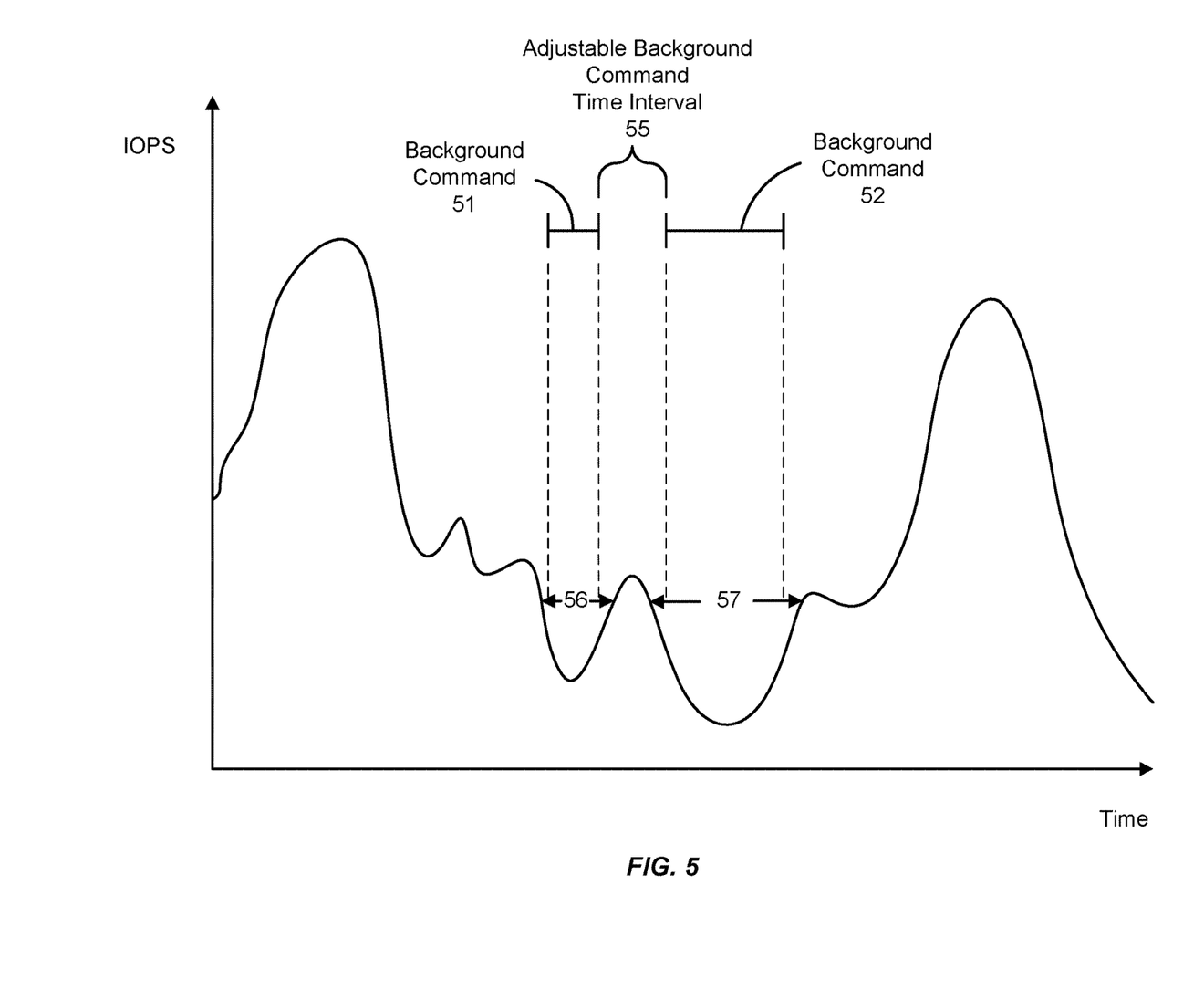
FIG. 5 is graph illustrating a storage device's exemplary workload over time and how background commands can be issued.

If the workload of the storage device 15 is relatively low, the controller 11 may issue the command, in the process element 45, and continue monitoring the workload of the storage device 15, in the process on the 41. However, if the workload of the storage device 15 is relatively high, the controller 11 may adaptively extend the timer of the pending command, in the process element 46, to ensure that it doesn't consume processing utilities needed for read and write I/O operations. An example of such as illustrated in FIG. 5. In this example, the controller 11 determines that lulls 56 and 57 exist in the read and write operations (e.g., the I/O operations per second, or "IOPS", of the storage device 15 are relatively low) in which the background commands 51 and 52 may be issued without substantially degrading I/O performance.

Alternatively or additionally, the controller 11 may determine whether a shorter duration pending background process exists, in the process element 47. If so, the controller 11 may determine whether its timer indicates an imminent command issuance, in the process element 42, to determine whether it may be issued ahead of the other pending background command. This is also illustrated in FIG. 5.

For example, the controller 11 may determine that the background command 51 will have a shorter duration of operation than the background command 52 (e.g., based on processing capabilities). And, as the shorter duration operation of the background command 51 can be implemented with less impact on the lull 56 in the IOPS then the background command 52, the background command 51 may be issued ahead of the background command 52. The controller 11 may then push the background command 52 to the top of a command buffer/queue such that it may be issued at the next lull 57 in the IOPS for which it may be better suited for less impact on the TOPS.

If no shorter pending background process exists, the controller 11 may adjust the interval of the next command, in the process element 48. For example, the controller 11 may adjust the time interval between the command of a first pending background process and the next command of a $2^{nd}$/next time slotted background process. This, in essence, adjusts the timers of the first and second commands. The controller 11 may then continue monitoring the workload of the storage device 15 to determine when the command of the first pending background process can be issued to the storage device 15.

Also in this embodiment is an optional command interrupt 43. The command interrupt 43 is operable to "inject" a background process to the storage device 15. For example, the controller 11 may determine that a background process, such as garbage collection, may be necessary at some point in time. The command interrupt 43 may be used to push the background process ahead of others in the command buffer. That is, the background command may be issued ahead of other background commands in the command buffer.

It should be noted that the workload of the storage device 15 is not intended to be limited to merely periods of "high" and "low" I/O activity. Rather, the storage controller 11 can monitor any level of workload and adjust how/when background commands are to be issued.

Figure 6A:
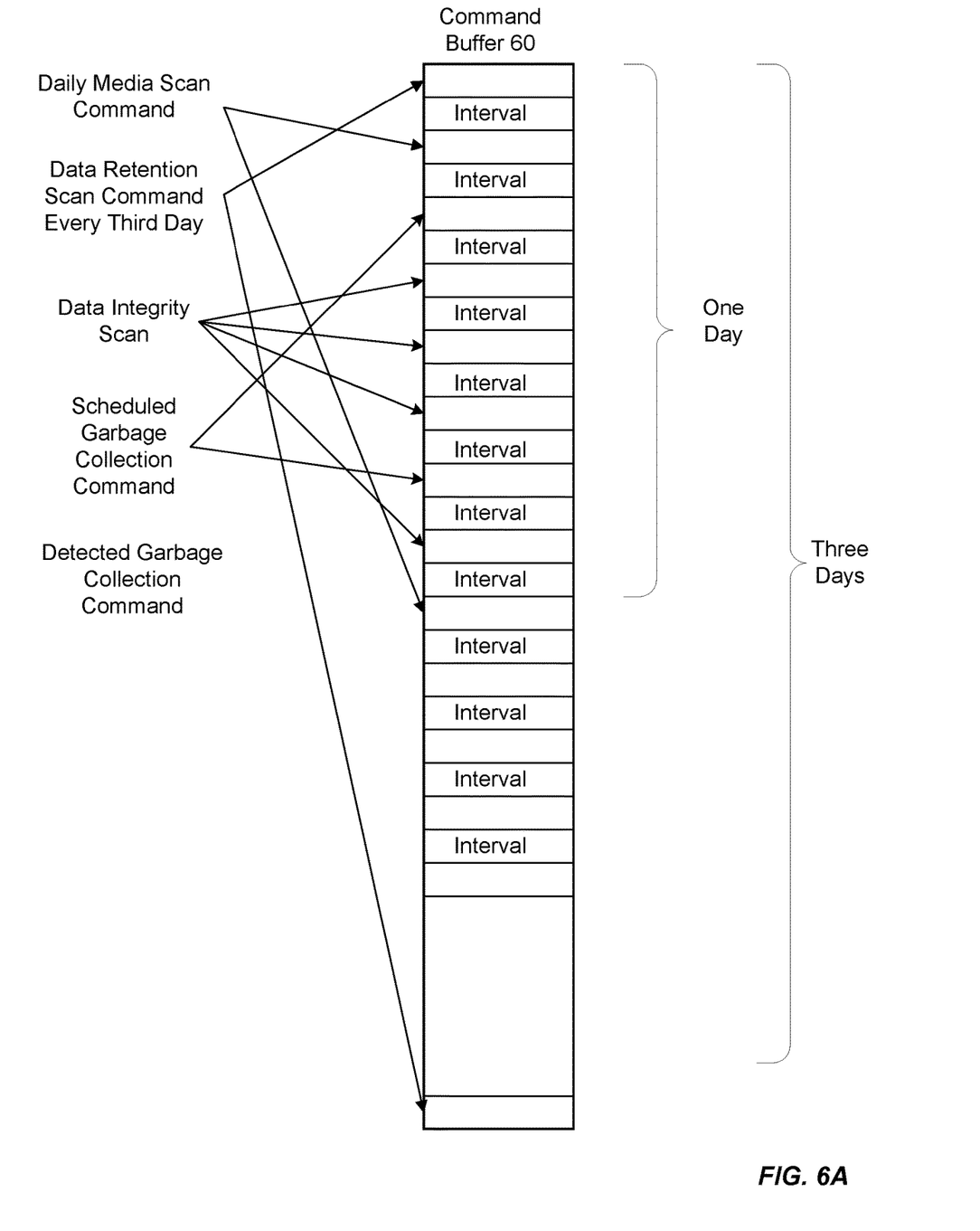
FIGS. 6A and 6B illustrate an exemplary command buffer used by a controller of the storage system of FIG. 1.
Figure 6B:
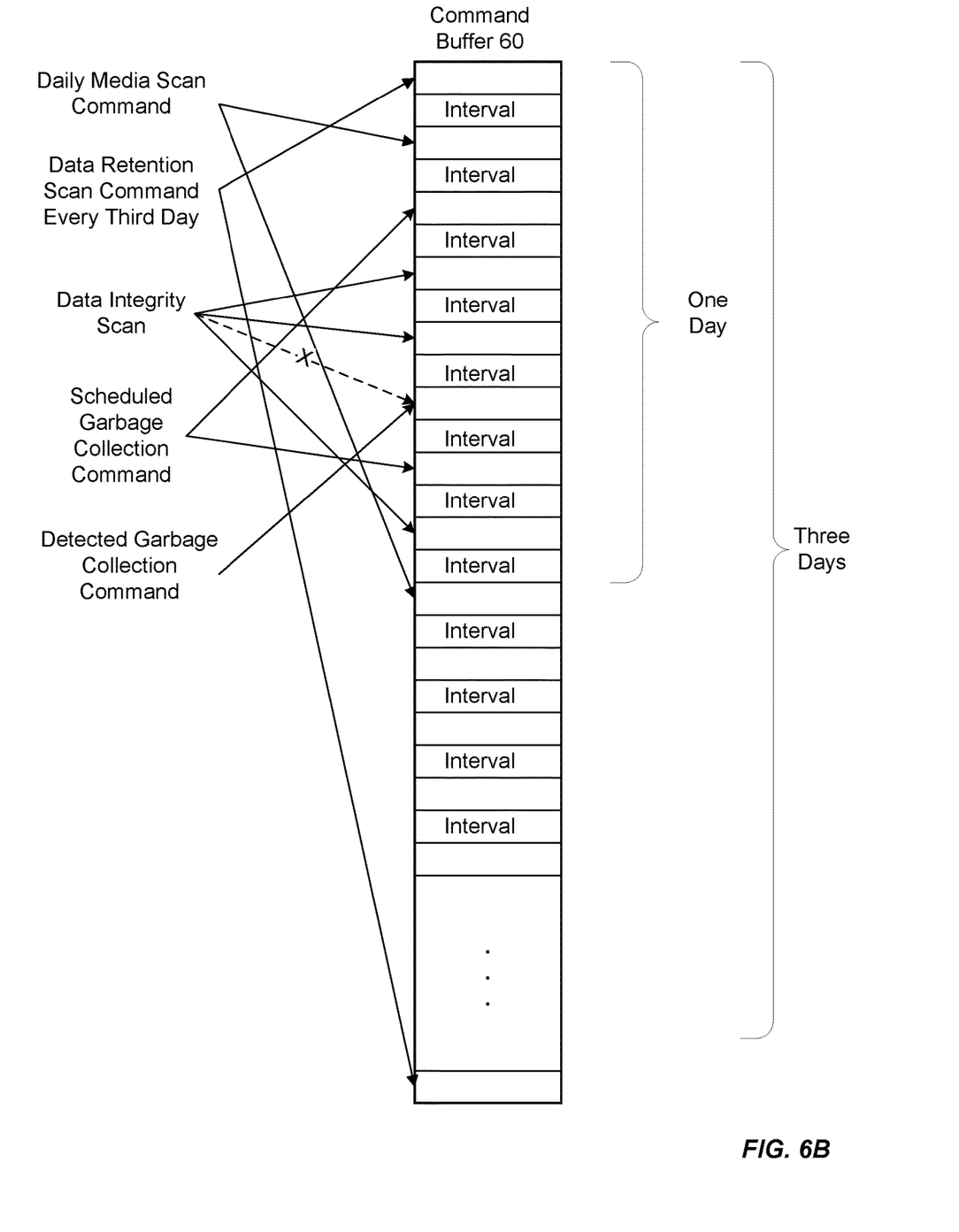

For example, FIGS. 6A and 6B illustrate a command buffer 60 that is operable to retain the pending commands and their various intervals between the commands for issuance by the controller 11. In this exemplary embodiment, the command buffer 60 is illustrated with times of one and three days. The data retention scan command occurring every third day is placed at the top of the command buffer 60. The daily media scan command placed in the command buffer 60 following the data retention scan (e.g., after the time interval 35). Other commands such as a data integrity scan and a scheduled garbage collection command are placed in the command buffer 60 at various points. The daily media scan command is then placed again in the command buffer 60 after three days (e.g., the predetermined time period that the controller 11 determines after monitoring the various background processes of the storage device 15.

Also illustrated in FIG. 6A is a detected garbage collection command. This command may be the result of a command interrupt 43 as illustrated in FIG. 4. For example, the controller 11 may determine that a garbage collection is to be performed on a particular block of the storage device 15. Thus, the controller may remove the data integrity scan from the command buffer 60, as illustrated in FIG. 6B, and insert the detected garbage collection command into the command buffer 60 in its place. The data integrity scan that was to occur may be relocated into another location of the command buffer 60 so as to ensure that the command still gets issued.

It should be noted that the embodiments herein are not intended to be limited to any types, numbers, command intervals, or orders of background commands/processes that may be implemented by the controller 11 in the command buffer 60. For example, the controller 11 may adaptively issue any type of command for background processes to the storage device 15 and/or establish any time intervals between the commands. Additionally, the processes described herein are also merely exemplary in nature and are not intended to be limited to the number or order of the process elements of those exemplary embodiments.

Figure 7:
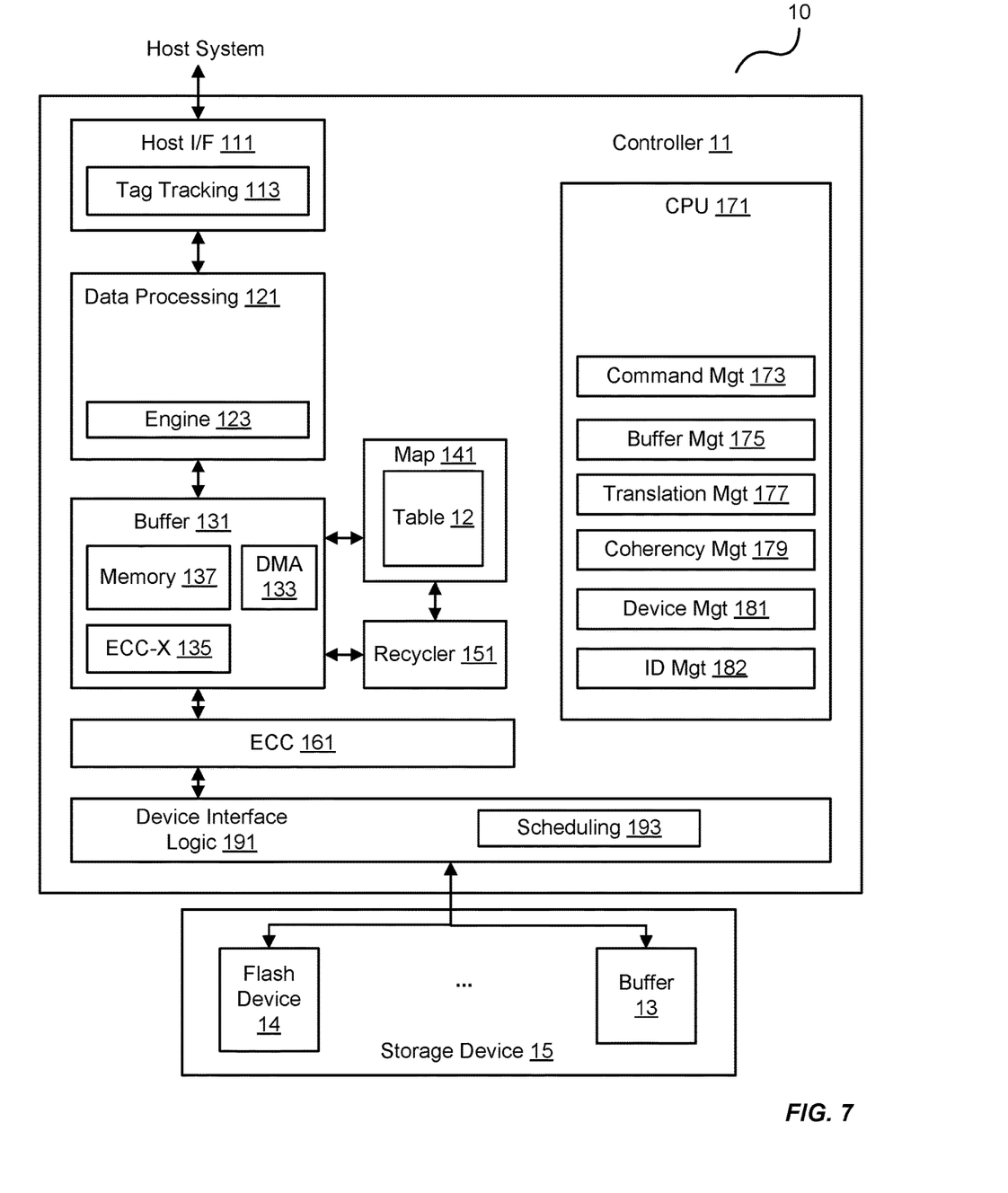
FIG. 7 is a block diagram of an exemplary storage controller and its associated storage device.
Figure 8:
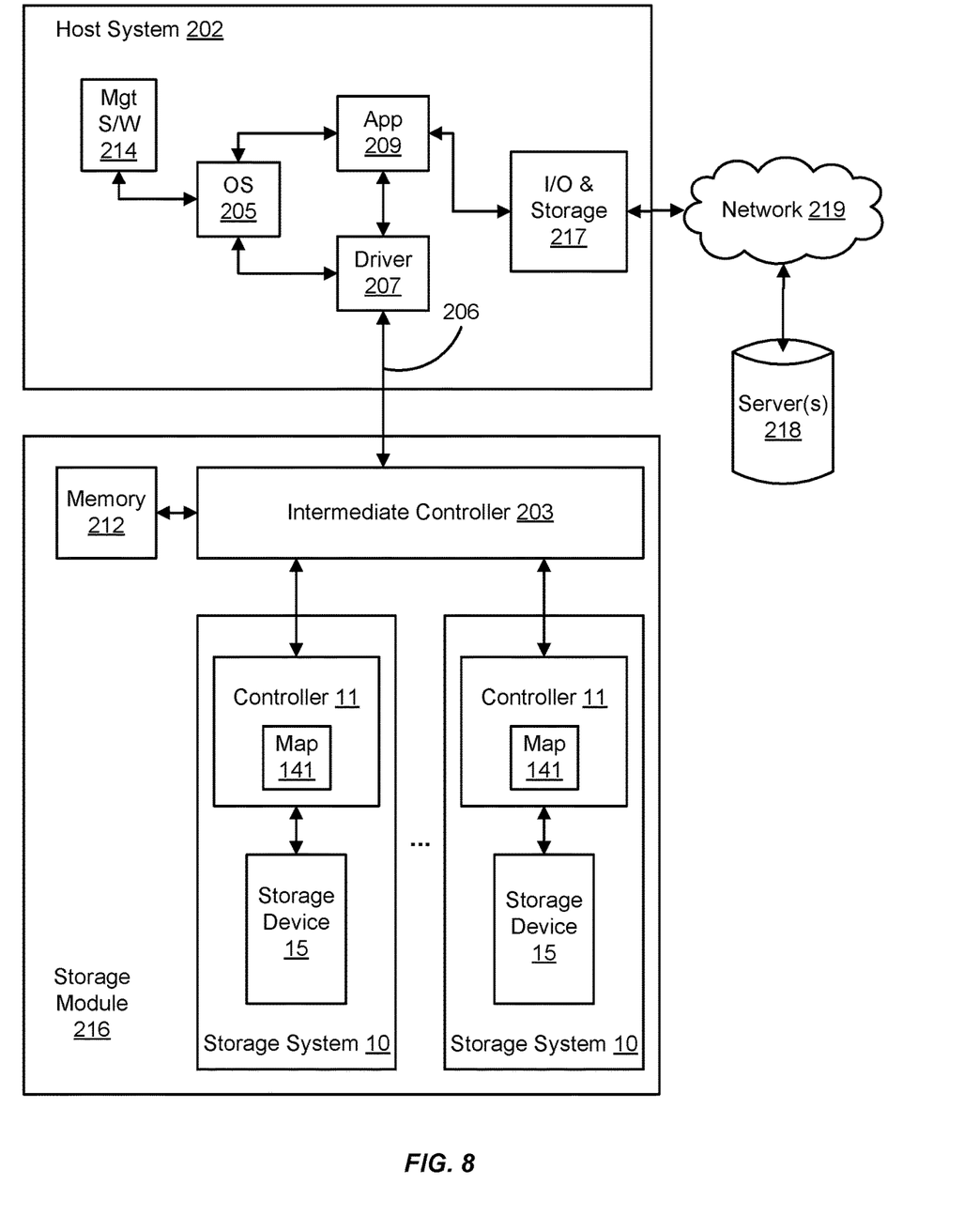
FIG. 8 is a block diagram of an I/O module comprising storage devices and their associated controllers interfacing with a host system.

Furthermore, the embodiments herein can take the form of hardware, firmware, software, or a combination thereof. For example, FIGS. 7 and 8 illustrate such a combination that may be operable to employ the systems and methods described herein. More specifically, FIG. 7 is a block diagram of an exemplary storage system 10 and its associated device controller (e.g., the controller 11) and storage device 15 (e.g., comprising flash devices 14). FIG. 8 is a block diagram of a storage module 216 comprising storage systems 10 and their associated controllers 11/storage devices 15 interfacing with a host system 502.

In FIG. 7, the controller 11 includes a host interface 111 that is operable to interface with a host system to communicate I/O operations of the host system. The host interface 111 may be configured with a tag tracking module 113 that is operable to track progress of individual I/O commands (e.g., read and write commands to certain addresses in the storage device 15). The tag tracking module 113 may associate an external flag of a command received from the host system with an internal flag that the controller 11 can access during processing of the command to identify the status of the processing.

The controller 11 also includes a data processing module 121 that comprises a processing engine 123 generally operable to perform certain tasks on data that is received from the host interface 111 or residing within a buffer 131, such as one or more of formatting the data, transcoding the data, compressing the data, decompressing the data, encrypting the data, decrypting the data, data encoding/formatting, or any combination thereof. For example, a processing engine 123 of the data processing module 121 may be operable to process the I/O operation from an I/O module of the host system generating the operation, such that the data of the I/O operation may be written to the logical address of the storage device 15. The processing engine 123 may extract the data of the write I/O command and prepare it for storage in the storage device 15. In doing so, the processing engine 123 may compress the data using any of a variety of data compression algorithms. When retrieving the data from the storage device 15, the processing engine 123 may decompress the data according to the algorithm used to compress the data for storage.

The buffer 131 is operable to store data transferred to and from the host system. The buffer 131 may also store system data, such as memory tables used by the controller 11 to manage the flash device 14, the buffer 13, and any possible higher-level RAID functionality in the memory 137. Other modules may include an error correcting code (ECC-X) module 135 to provide higher-level error correction and redundancy functionality, and a Direct Memory Access (DMA) module 133 to control movement of data to and from the buffer 131.

The controller 11 also includes an error correction code module 161 operable to provide lower level error correction and redundancy processing of the data in the buffer 131 using any of a variety of error correction codes techniques (e.g., cyclic redundancy checks, Hamming codes, low-density parity check coders, etc.).

A device interface logic module 191 is operable to transfer data to and from the storage device 15 according to the protocol of the devices therein. The device interface logic module 191 includes a scheduling module 193 that is operable to queue I/O operations to the storage device 15.

The controller 11 herein also includes a map module 141 that is operable to perform data addressing to locations in the storage device 15 according to the lookup table 12. For example, the map module 141 may use the lookup table 12 to convert logical block addresses (LBAs) from the host system to block/page addresses directed to the buffer 13, the flash device 14, or both. The lookup table 12 may be stored in whole or in part in controller 11 and/or in storage device 15. For example, in some embodiments a portion of the lookup table 12 may be cached in the controller 11 with generally all of lookup table 12 being stored non-volatilely in the storage device 15.

A recycler 151 performs garbage collection on behalf of the controller 11. For example, the recycler 151 may determine portions of the storage device 15 that are actively in use by scanning the lookup table 12 of the map module 141. In this regard, the recycler 151 may make unused, or "deallocated", portions of the storage device 15 available for writing by erasing the unused portions. The recycler 151 may also move data within the storage device 15 to make larger contiguous portions of the storage device 15 available for writing.

The controller 11 also includes a CPU 171 that controls various aspects of the controller 11. For example, the CPU 171 may process instructions or firmware to implement command management 173 that tracks and controls commands received from the host system. This firmware may also implement buffer management 175 that controls allocation and use of the buffer 131 and translation management 177 or to control the map module 141. The firmware may also employ coherency management 179 to control consistency of data addressing to avoid conflicts such as those that may occur between external data accesses and recycled data accesses. The firmware may also provide device management 181 to control the device interface logic module 191 and identity management 182 to control modification and communication of identity information of components within the controller 11.

In FIG. 8, the host system 202 is operable to process software instructions and perform I/O operations with the storage module 216 to read from and write to one or more storage systems 10. In this regard, the host system 202 may include an operating system 205 that provides the computing environment for the host system 202. A driver 207 is operable to communicate through the link 206 to the storage module 216 to perform the I/O operations with the various storage systems 10 configured therewith.

Like other computing systems, the operating system 205 may be initiated via management software 214 (e.g., Bios software). The host system 202 may also include application software 209 to perform various computing processes on behalf of the host system 202 (e.g., word processing applications, image processing applications, etc.). The host system 202 may also include I/O and storage functionality 217 operable to conduct I/O operations with one or more servers 218 through a communication network 219 (e.g., the Internet, local area networks, wide-area networks, etc.). In this regard, the storage module 216 may act as a cache memory of I/O operations for the host system 202.

The storage module 216 may be configured with an intermediate controller 203 that is operable to switch various I/O operations of the host system 202 to LBAs of the storage systems 10. In this regard, the storage module 216 may include a memory 212 that stores mapping information for the intermediate controller 203 to conduct the I/O operations to the LBAs. The map module 141 of the controller 11 may also be operable to perform data addressing with variable-sized mapping units to locations in the storage device 15 according to the lookup table 12, and convert LBAs from the host system 202 to block/page addresses directed to the storage device 15.

What is claimed is:

1. A storage system, comprising:
   a storage device operable to store data; and
   a controller operable to monitor a plurality of background commands issued to the storage device over a pre-determined period of time, to determine how often each of the background commands is issued during the pre-determined period of time, to establish a time interval for each of the background commands, and to issue each of the background commands at their respective time intervals, the background commands are selected from the group consisting essentially of: data retention scan commands; garbage collection commands; read disturb scan commands; read voltage calibration commands; data integrity scan commands; read-retry scans; media scan commands; background read commands for NAND error mitigation; and background write commands for NAND error mitigation.

2. The storage system of claim 1, wherein:
   the storage device is a solid state drive (SSD).

3. The storage system of claim 1, wherein:
   the controller is further operable to adaptively configure the time intervals of the background commands based on a workload of the storage device.

4. The storage system of claim 1, wherein:
   the storage device is a hard disk drive.

5. The storage system of claim 1, wherein:
   the controller is further operable to start a timer after issuance of a first of the background commands, to detect that expiration the timer is pending, to identify a second of the background commands with a timer expiration that is pending, to determine that the second background command has a shorter duration than the first background command, and to issue the second background command before the first background command.

6. The storage system of claim 1, further comprising:
   a command buffer operable to issue the background commands when directed by the controller, the controller being further operable to insert a new background command into the command buffer based on a command interrupt that adjusts issuance timing of subsequent background commands.

7. A method operable with a storage device, the method comprising:
   monitoring a plurality of background commands issued to the storage device over a pre-determined period of time;
   determining how often each of the background commands is issued during the pre-determined period of time;
   establishing a time interval for each of the background commands; and
   issuing each of the background commands at their respective time intervals, the background commands being selected from the group consisting essentially of: data retention scan commands; garbage collection commands; read disturb scan commands; read voltage calibration commands; data integrity scan commands; read-retry scans; media scan commands; background read commands for NAND error mitigation; and background write commands for NAND error mitigation.

8. The method of claim 7, wherein:
the storage device is a solid state drive (SSD).

9. The method of claim 7, further comprising:
adaptively configuring the time intervals of the background commands based on a workload of the storage device.

10. The method of claim 7, wherein:
the storage device is a hard disk drive.

11. The method of claim 7, further comprising:
starting a timer after issuance of a first of the background commands;
detecting that expiration the timer is pending;
identifying a second of the background commands with a timer expiration that is pending;
determining that the second background command has a shorter duration than the first background command; and
issuing the second background command before the first background command.

12. The method of claim 7, further comprising:
inserting a new background command into a command buffer based on a command interrupt that adjusts issuance timing of subsequent background commands.

13. A non-transitory computer readable medium comprising instructions that, when executed by a controller of a storage device, direct the controller to:
monitor a plurality of background commands issued to the storage device over a pre-determined period of time;
determine how often each of the background commands is issued during the pre-determined period of time;
establish a time interval for each of the background commands; and
issue each of the background commands at their respective time intervals, the background commands being selected from the group consisting essentially of: data retention scan commands; garbage collection commands; read disturb scan commands; read voltage calibration commands; data integrity scan commands; read-retry scans; media scan commands; background read commands for NAND error mitigation; and background write commands for NAND error mitigation.

14. The non-transitory computer readable medium of claim 13, wherein:
the storage device is a solid state drive (SSD).

15. The non-transitory computer readable medium of claim 13, further comprising instructions that direct the controller to:
adaptively configure the time intervals of the background commands based on a workload of the storage device.

16. The non-transitory computer readable medium of claim 13, wherein:
the storage device is a hard disk drive.

17. The non-transitory computer readable medium of claim 13, further comprising instructions that direct the controller to:
start a timer after issuance of a first of the background commands;
detect that expiration the timer is pending;
identify a second of the background commands with a timer expiration that is pending;
determine that the second background command has a shorter duration than the first background command; and
issue the second background command before the first background command.

* * * * *